US009740728B2

(12) United States Patent
Mukund et al.

(10) Patent No.: US 9,740,728 B2
(45) Date of Patent: Aug. 22, 2017

(54) SYSTEM AND METHOD FOR TRACKING THE CONVERSION OF NON-DESTRUCTIVE EVALUATION (NDE) DATA TO ELECTRONIC FORMAT

(71) Applicant: NanoArk Corporation, Fairport, NY (US)

(72) Inventors: Vanditha Mukund, Penfield, NY (US); Ajay Pasupuleti, Fairport, NY (US)

(73) Assignee: NANOARK CORPORATION, Fairport, NY (US)

( * ) Notice: Subject to any disclaimer, the term of this patent is extended or adjusted under 35 U.S.C. 154(b) by 265 days.

(21) Appl. No.: 14/513,204

(22) Filed: Oct. 13, 2014

(65) Prior Publication Data
US 2015/0106885 A1 Apr. 16, 2015

Related U.S. Application Data

(60) Provisional application No. 61/890,599, filed on Oct. 14, 2013.

(51) Int. Cl.
G06F 7/00 (2006.01)
G06F 17/30 (2006.01)
G06F 21/31 (2013.01)
G06F 21/62 (2013.01)

(52) U.S. Cl.
CPC .. *G06F 17/30371* (2013.01); *G06F 17/30289* (2013.01); *G06F 21/31* (2013.01); *G06F 21/629* (2013.01)

(58) Field of Classification Search
CPC ........ G06F 5/00; G06F 7/60; G06F 17/30179; G06F 19/322; G06F 2205/00; G06F 21/32; G06F 11/0733; G06F 17/30371; G06F 21/629; G06F 21/31; G06F 17/30289
USPC .......... 707/690, 703, 811, 999.107
See application file for complete search history.

(56) References Cited

U.S. PATENT DOCUMENTS

| 4,903,141 | A | * | 2/1990 | Morton | H04N 1/40 348/112 |
|---|---|---|---|---|---|
| 5,687,250 | A | * | 11/1997 | Curley | G06K 9/036 382/112 |
| 5,845,018 | A | * | 12/1998 | Breish | H04N 1/00795 382/276 |
| 5,949,479 | A | * | 9/1999 | Maruyama | H04N 1/00249 348/107 |
| 6,351,553 | B1 | | 2/2002 | Hayosh | |
| 6,744,936 | B2 | | 6/2004 | Irons et al. | |
| 6,775,442 | B2 | | 8/2004 | Kaeriyama et al. | |
| 6,810,232 | B2 | | 10/2004 | Knowles et al. | |
| 6,820,094 | B1 | | 11/2004 | Ferguson et al. | |
| 7,213,066 | B2 | | 5/2007 | Piersol | |
| 7,310,651 | B2 | | 12/2007 | Dave et al. | |

(Continued)

*Primary Examiner* — Mohammed R Uddin

(57) ABSTRACT

Systems and methods are disclosed for tracking the conversion of data from a hardcopy or physical format such as radiograph film to electronic format such as DICONDE format. The method provides the capability of automatic consistency checks of image quality generated by the digitizer as well as allows for process quality checks by users. Authentication and authorization is built into the digitization process to allow access to authorized users for a particular task. The system provides the capability to generate statistical process control (SPC) curves and reports of the consistency checks. Disaster recovery capability is built into the system.

57 Claims, 11 Drawing Sheets

(56) References Cited

U.S. PATENT DOCUMENTS

| | | | |
|---|---|---|---|
| 7,349,577 B2 | 3/2008 | Kaneda et al. | |
| 7,446,892 B1* | 11/2008 | Churchill | G06F 17/30011 358/1.15 |
| 7,529,408 B2 | 5/2009 | Vohariwatt et al. | |
| 7,936,951 B2 | 5/2011 | Duan | |
| 7,979,398 B2* | 7/2011 | DeBie | G06Q 10/10 382/305 |
| 8,688,579 B1* | 4/2014 | Ethington | G06Q 40/02 705/35 |
| 8,775,377 B1* | 7/2014 | Zhang | G06F 17/00 707/610 |
| 8,982,185 B1* | 3/2015 | Shastri | H04N 21/23418 348/43 |
| 2002/0049623 A1* | 4/2002 | Martin | G06Q 10/0639 705/7.41 |
| 2002/0111960 A1 | 8/2002 | Irons et al. | |
| 2004/0024662 A1* | 2/2004 | Gray | G06Q 10/06 705/29 |
| 2004/0125400 A1* | 7/2004 | De Graaff | H04N 1/32101 358/1.15 |
| 2005/0185225 A1* | 8/2005 | Brawn | H04N 1/00413 358/401 |
| 2005/0220324 A1* | 10/2005 | Klein | G07D 11/0066 382/112 |
| 2005/0246341 A1* | 11/2005 | Vuattoux | G06Q 10/10 |
| 2005/0289182 A1 | 12/2005 | Pandian et al. | |
| 2006/0176521 A1* | 8/2006 | Stern | G06F 17/30011 358/462 |
| 2007/0011149 A1* | 1/2007 | Walker | G06F 17/30265 |
| 2007/0168382 A1* | 7/2007 | Tillberg | G06F 17/30253 |
| 2008/0285092 A1* | 11/2008 | Curtis | H04N 1/32101 358/474 |
| 2009/0187598 A1 | 7/2009 | Vohariwatt et al. | |
| 2009/0214085 A1* | 8/2009 | Bickell | G06K 9/03 382/112 |
| 2009/0307756 A1* | 12/2009 | Kang | G06F 21/6218 726/4 |
| 2010/0076967 A1* | 3/2010 | Canora | G06F 17/30041 707/732 |
| 2011/0081051 A1* | 4/2011 | Tayal | G06K 9/036 382/112 |
| 2011/0128966 A1* | 6/2011 | Westin | H04L 12/5835 370/401 |
| 2011/0188718 A1* | 8/2011 | Hill | G06F 19/321 382/128 |
| 2011/0243478 A1 | 10/2011 | Duan | |
| 2012/0011216 A1 | 1/2012 | Zuber | |
| 2012/0030187 A1 | 2/2012 | Marano et al. | |
| 2012/0246741 A1* | 9/2012 | Klotz | G06F 19/322 726/28 |
| 2013/0022231 A1* | 1/2013 | Nepomniachtchi | G06Q 20/042 382/102 |
| 2013/0287270 A1* | 10/2013 | Harper | G06K 9/00073 382/124 |
| 2014/0002840 A1* | 1/2014 | Takano | G06F 3/1201 358/1.13 |

* cited by examiner

100

300

300a

300b

300c

300d

SYSTEM AND METHOD FOR TRACKING THE CONVERSION OF NON-DESTRUCTIVE EVALUATION (NDE) DATA TO ELECTRONIC FORMAT

CROSS-REFERENCE TO RELATED APPLICATIONS

Under 35 USC 119(e), this application claims the benefit of U.S. Provisional Application No. 61/890,599 filed Oct. 14, 2013, which is hereby incorporated by reference in its entirety

FIELD OF THE PRESENT DISCLOSURE

This disclosure generally relates to tracking data conversion and more specifically to a tracking conversion of a physical format to electronic data.

BACKGROUND

Storing data in physical format for an extended period of time is not always feasible. Data is converted to electronic format and stored for easy access and efficient storage mechanism. The process of converting from physical format to electronic format requires an efficient and manageable process with reliable digitization equipment, ability to track the data at each step of the process and constant monitoring of quality.

Accordingly, the present invention addresses such a need and solution and is directed to such a need in overcoming the prior limitations in the field

SUMMARY

This disclosure is directed to a system and method for tracking conversion of data from one format to another. In one embodiment, the system comprises a data conversion tracking system, which includes a file system to store electronic data, a database to store a metadata and a status associated with the electronic data and the file system and an user interface. The system also includes a consistency check module to check the consistency of data conversion, and a metadata module to capture, alter and verify metadata associated with the electronic data and the file system.

The method of tracking conversion of data comprise receiving plurality of inputs in a plurality of first containers, the plurality of first containers reside in a second container, generating a second container identifier for the second container, generating and storing metadata associated with the second container, generating a unique first container identifier for each of the plurality of first containers, storing metadata associated with the first container, the metadata associated with the first container includes the first container identifier and data associated with each of the plurality of first containers on the first server, generating an electronic data for each of the plurality of inputs and storing the electronic data on the first server, generating and storing a meta data associated with the electronic data for the each of the plurality of inputs on the first server, storing a status of the electronic data on the first server, checking the quality of the electronic data on the first server, and storing the electronic data on a storage device.

DETAILED DESCRIPTION

Figure 1:
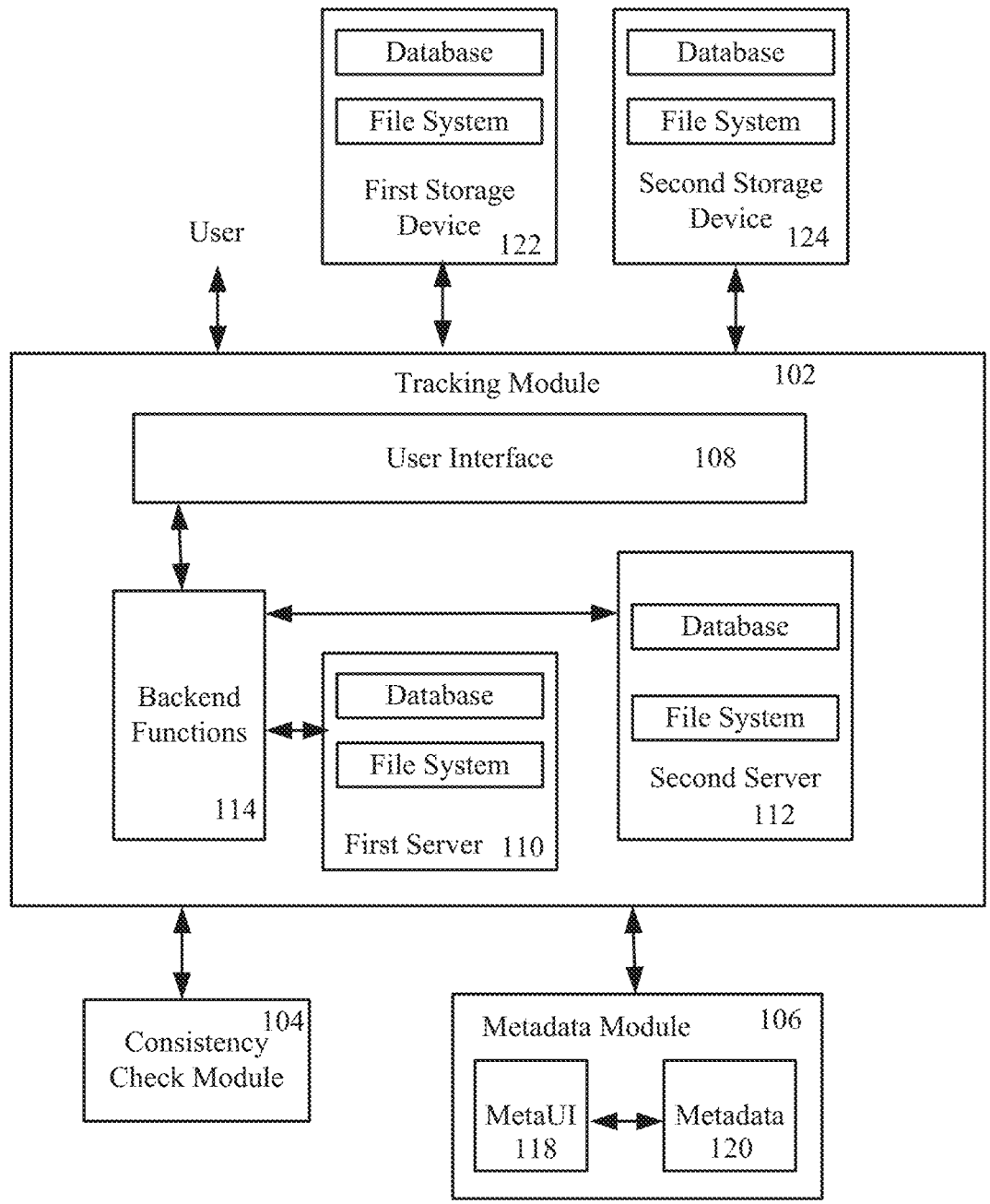
FIG. 1 is a block diagram of a system in accordance with an embodiment

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating." "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Further, the order of the steps performed is not relevant unless explicitly stated.

The techniques described herein may be implemented in hardware, software, firmware, manual intervention or any combination thereof, unless specifically described as being implemented in a specific manner. If implemented in software, the techniques may be realized at least in part by a non-transitory processor-readable storage medium comprising instructions that, when executed, performs one or more of the methods described above. The non-transitory processor-readable data storage medium may form part of a computer program product.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

In the described embodiments digital image conversion and digitization are used interchanging to indicate the process of generating a digital image.

The steps described herein may be implemented using any suitable processor and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The computer readable or computer storage medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), Blu-ray disk and compact disk-read/write (CD-RW). To describe the features of the present disclosure in more detail refer now to the following description in conjunction with the accompanying figures.

As will be described more fully below, this disclosure provides techniques for tracking conversion of radiograph film to an electronic format. Though the described exemplary embodiments describe the radiograph film as an input to the tracking system, the steps described to track the conversion to electronic format, checking for quality of the conversion, and storing the electronic data can be applied to other forms of inputs. The inputs can be physical medium or a hardcopy format non-destructible evaluation or a different electronic format.

To describe the features of the present invention in more detail refer now to the following description in conjunction with the accompanying Figures.

FIG. 1 illustrates a system 100 of tracking of conversion of radiograph film and associated paper document into electronic format. In an exemplary embodiment, the radiograph film and associated paper document is converted to Digital Imaging, and Communication in Nondestructive Evaluation (DICONDE) compatible electronic data. System 100 also includes digitization of radiograph film, quality check, process control, disaster recovery, automation of metadata gathering as well as application of metadata to the digitized images.

The digitization process is controlled by allowing access to authorized users only for a particular operation. Authentication and authorization is built into the digitization process. The process covers from receiving radiograph film to the shipment of the radiograph film with several quality checks and data integrity checks.

Built in checks to ensure that the image has been captured as per specifications (e.g. at the specified resolution and optical density values). If error is detected process is stopped and restarted only after corrective action is taken. Progress from one step to another is closely monitored and progress to the next step is allowed when all requirements of the previous step have been satisfied. Quality assurance is enabled both my automatic consistency check and manual check.

The system provides the capability to generate statistical process control (SPC) curves and reports. Fail safe mechanisms to prevent accidental purging of digital data or accidental reclaim of physical data before it is safe to do so. The system includes user interaction via client application, web browser and mobile application. The system is developed as a client-server system. Metadata can be captured in bulk from existing databases, spreadsheets, etc.

System 100 includes a tracking module 102, consistency check module 104, metadata module 106, first storage 122 and second storage 124 among others. Tracking module 102 comprises a user interface 108, first server 110 and second server 112 and backend functions 114 among others. User interface module 108 provides an interface to user to receive and output various data. The user interface module 108 receives at least digitized images, user credentials, user input from quality check, consistency check, metadata, and status update among others. User interface module 108 displays results of user authentication, output of consistency check, metadata, and status check.

User interface 108 receives metadata from user and communicates with metadata module 106 via metadata UI 118 to take certain actions such as create, modify, store, verify or retrieve metadata. User interface 108 also provides user interface to consistency check module 104. In an embodiment, user interface 108 may be an interface to a barcode and/or RFID recognition system for metadata collection and status retrieval.

First server 110, second server 112, first storage and second storage each consist of a file system and a database. First and second storage are devices that can be shipped. In an embodiment, first and second storage devices may be any of optical disk, magnetic disk or any other mass storage device.

The file system stores digitized images in a file structure. In an exemplary system, the radiograph film is arranged in boxes. A box contains several sleeves and each sleeve contains several radiograph film. A file structure similar to the arrangement of radiograph film is maintained in the file system, wherein a folder is associated with a box, a sub-folder is associated with a sleeve, and digital images are stored in the sub-folders.

The database stores metadata associated with the box, metadata associated with the sleeve and metadata associated with the image. Backend functions include a variety of tasks including verifying user credentials, authenticating the user and granting permissions to perform certain tasks, status updates.

First server 110 stores the digitized images and the associated metadata after first quality check, second server 112 stores digital images and the associated metadata after second quality check. First storage 122 is an archival of the radiograph film that is shipped and stored at a first location, while second storage is shipped and stored at a second location for disaster recovery.

Consistency check module 104 periodically checks the quality of digitization of radiograph film. The consistency check includes image-level checks related to skew, modulation, and aliasing. Consistency check involves converting an industry standard radiology film that conforms to American Society for Testing and Materials (ASTM) E1936 to a digital image and comparing various parameters against expected industry standard results. System 100 provides the capability to generate statistical process control (SPC) curves and reports based on selection of various parameters or combination of parameters. Examples include, but are not limited to, curves depicting measurement of specific points on the test targets over time, and production reports depicting digitization rate over a date range by digitizer Metadata module 106 comprises Meta UI and metadata. Meta UI provides automation and error reduction in the metadata capture process by capturing a portion of the metadata from existing metadata, thereby reducing user entry of data and hence error reduction. In some embodiments metadata module may create an output of metadata in spreadsheet or Comma Separated Variable (CSV) format.

In some embodiments, system 100 may be a mobile unit i.e. the tracking module, consistency check and metadata modules resides in a unit which can be transported from one facility to another.

Figure 2A:
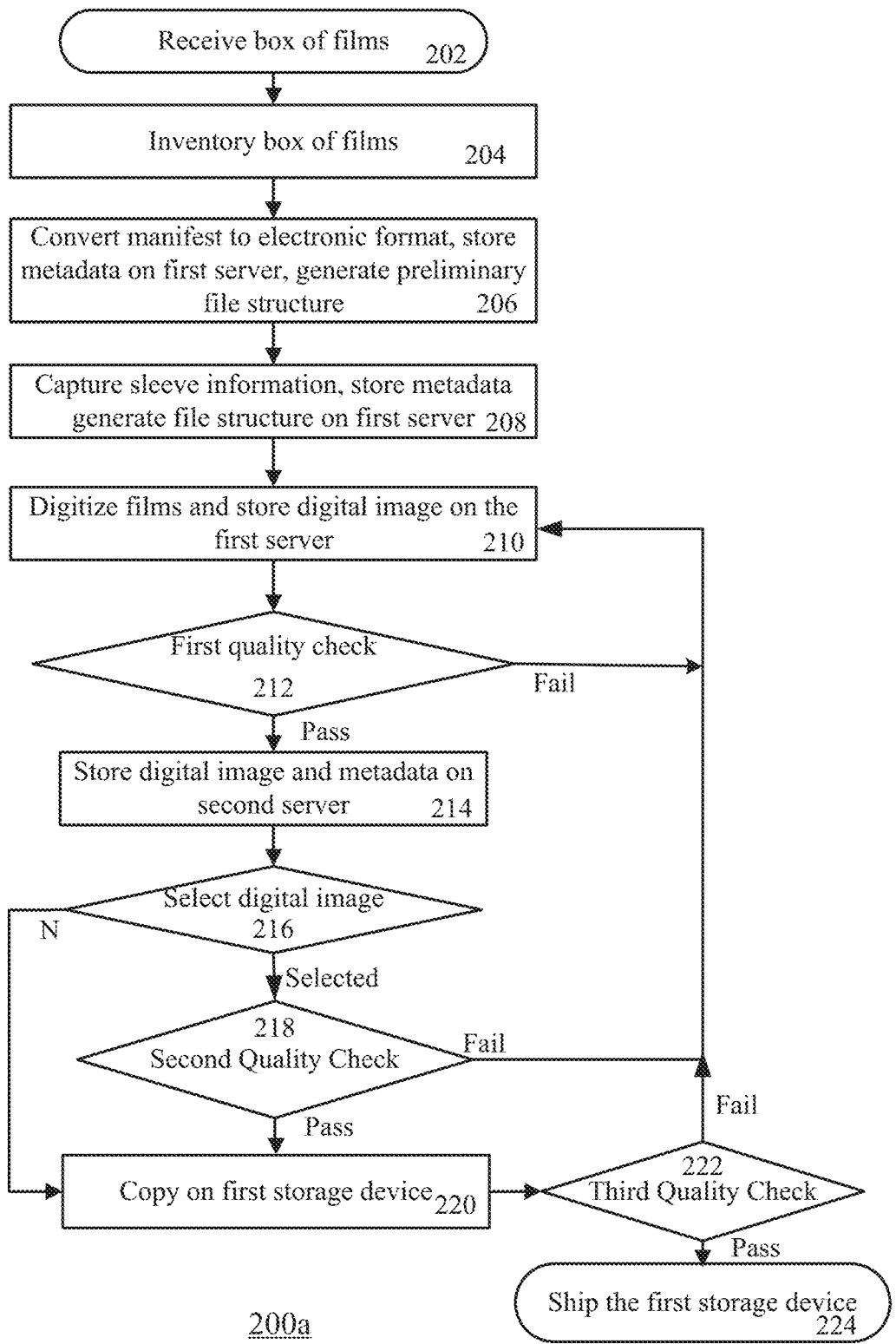
FIGS. 2a and 2b depicts flow charts representing the operation in accordance with an embodiment.

FIG. 2 illustrates a method of tracking the digitization process. In an exemplary embodiment, method 200 receives radiograph film in an arrangement of boxes and sleeves in step 202. Each box houses plurality of sleeves and each sleeve houses a plurality of radiograph films. In other embodiments, the radiograph film or any other physical medium or hard copy can be received in any other suitable arrangement such as folders, boxes, bags etc. In case the data is received in electronic format, the data can be received in boxes of hard disk or CDROM or other electronic data storage medium, arranged in folders and files. Inventory of the box is the next in step 204. The inventory of the box is further verified, the list of contents is converted to electronic format and metadata of the box is extracted or generated in step 206. In some embodiments, a portion of the metadata is presented to the user by automatically extracting from the system. The user updates or adds new metadata to the existing metadata. The list of contents of the box and the metadata of the box are stored in database on the first server. The metadata of the box can be either created or altered if already present in the database. In this step, a preliminary file structure with a folder uniquely identifying the box is created in the file system on the first server, if not already present. The metadata of the sleeve serves as a header tag for all the files that will be stored in that folder. In an exemplary embodiment of digitization into DICONDE images, the metadata is inserted into specified DICONDE tags for each image.

In an embodiment, information on the sleeve is extracted by taking an image of the sleeve and automatically reading the information in the image and to fill the data fields in step 208. In other embodiments, the sleeve data can be entered manually or extracted from an electronic format or any other means. A file structure uniquely identifying the sleeve is created in the file system on the first server. In an embodiment, a sub-folder identifying the sleeve could reside in the folder identifying the box the sleeve belongs to.

In step 210, the radiograph film is digitized and stored in the appropriate file structure belonging to the box and the sleeve in the first server. Transfer of digital image from the digitizer to the first server is accompanied with data integrity checks e.g. checksum and/or bit by bit comparison to ensure correct data transfer. Data integrity checks are performed for all digital image transfers in method 200 from initial digital image creation to final writing onto archival and disaster recovery media.

A first quality check is performed in step 212. The first quality check may include a process quality check and an actual image check. The process quality check may be performed by a user to ensure that the digital image is stored in an appropriate file structure, the metadata on the sleeve matches the stored metadata on the first server, and a high level check of the quality of the digital image. The first quality check may also include data integrity check such as checksum and/or bit by bit comparison of the digital image generated from the digitizer and the digital image stored on the first server. The results of the process quality check may be indicated at the folder, sub-folder or image level. The image quality check comprises a user comparing the digital image with the radiograph film to ensure that the digital image is of good quality. The user indicates progress to the next step after the first quality check is passed. If the quality check does not pass, the user takes corrective actions such as digitize the image once again or capture the correct metadata or correct the file structure. The digital image is checked for quality once again before proceeding to the next step. In some embodiments all the images are checked for quality, in other embodiments, a sampling algorithm is applied to select the digital image for quality check. After the digital image passes the first quality check, the digital image and the metadata are stored on a second server in step 214.

In some embodiments, the digital image is selected in step 216 using a sampling algorithm to perform a second quality check before copying to a first storage device. The images not selected for the second quality check are copied on first storage device in step 220. In other embodiments all the images are selected for the second quality check.

A second quality check 218 is performed on selected images. The second quality check comprises a verifying the digital image with the original data i.e. the radiograph film. The metadata enable identifying the physical copy with the digital image. The second quality check may also include data integrity check such as checksum and/or bit by bit comparison of the digital image in the first server with the copy in the second server.

If the digital image matches the radiograph film, the digital image is stored on first storage device 122 such as optical disk or magnetic disk for archival purposes. The digital images that do not pass the second quality check are digitized once again.

In certain embodiments, a third quality check as in step 222 is performed on selected digital images where in the digital image on the first storage device is compared with the radiograph film. The third quality check may also include data integrity check such as checksum and/or bit by bit comparison of the digital image in the second server with the copy in the first storage device server.

Figure 2B:
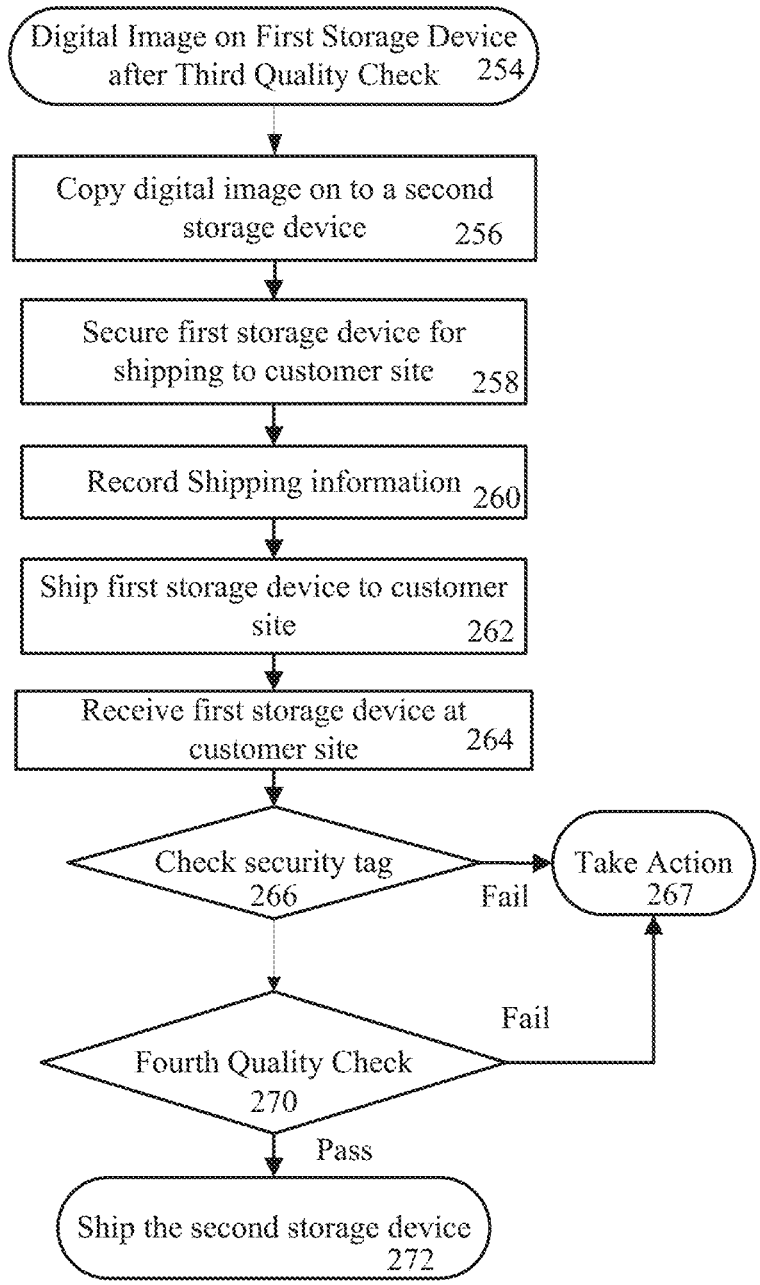

As depicted on step 224, if the third quality check passes, the first storage device is shipped for archival. The digital images that do not pass the third quality check are digitized once again In some embodiments, before shipping for archival, method 200b is performed. FIG. 2b illustrates a method of confirming validity and integrity of the archival process and disaster recovery storage. In method 200b, after the third quality check passes, the digital image is stored on the first storage device in step 254. A copy of the digital image is stored on second storage device in step 256. The copy on the second storage device serves as an archival and disaster recovery media. The first storage device is prepared for shipping to customer site by accumulating a plurality of storage devices that needs to be shipped to the customer site in step 258. Typically a plurality of storage devices are secured in a box and a plurality of boxes are secured in a pallet for shipping. Shipping information such as the destination, number of storage devices, the date and a unique identification number associated with the storage device are recorded in the tracking module in step 260. This step also includes applying a security tag to the first storage device. The security tag ensures that the first storage device is not tampered in transit. The first storage device is shipped in step 262. After receiving the first storage device at the customer site in step 264, the security tag is examined for tampering in step 266. If the security tag indicates tampering of the first storage device, user takes appropriate action in step 267 such as shipping the first storage device again as in step 258 or digitizing the radiograph film again. If the security tag indicates no tampering, a fourth quality check is performed at the customer site by comparing the radiograph film with the digital image on the first storage device in 270. In step 267, the digital images that do not pass the fourth quality check are digitized once again. In an embodiment, the fourth quality check can be performed on selected digital images.

The selection can be made by applying a sampling algorithm. The digital images not selected for the fourth quality check bypass step 270. The second storage device is shipped. In an embodiment, the first storage device and the second storage device are shipped separately and to different sites to enable recovery in case of a disaster. Every digital image stored on the first storage device is associated with its copy stored on the second storage device by a unique identifier. Similarly, every image stored on the second storage device is associated with its copy on the first storage device by a unique identifier. The unique identifier ties the disaster recovery media with its primary archive.

The process of conversion to digital images is monitored at intervals of time in order to ensure consistency in the quality of the digital images. The consistency checking process is automated once it is initiated by a user. The consistency checking process is initiated at the discretion of the user. Consistency check can be initiated at least once for every box of radiograph film or at least once for a fixed interval of time or any other event such as repeated failure of the quality checks may trigger the consistency check.

The consistency check includes image-level checks related to skew, modulation, and aliasing. Consistency check involves converting an industry standard radiology film to a digital image and comparing against expected industry standard results.

In an embodiment, the consistency check is based on a radiograph film that conforms to ASTM standard E1936-03 which is the "Standard Reference Radiograph for Evaluating the Performance of Radiographic Digitization Systems".

Figure 3:
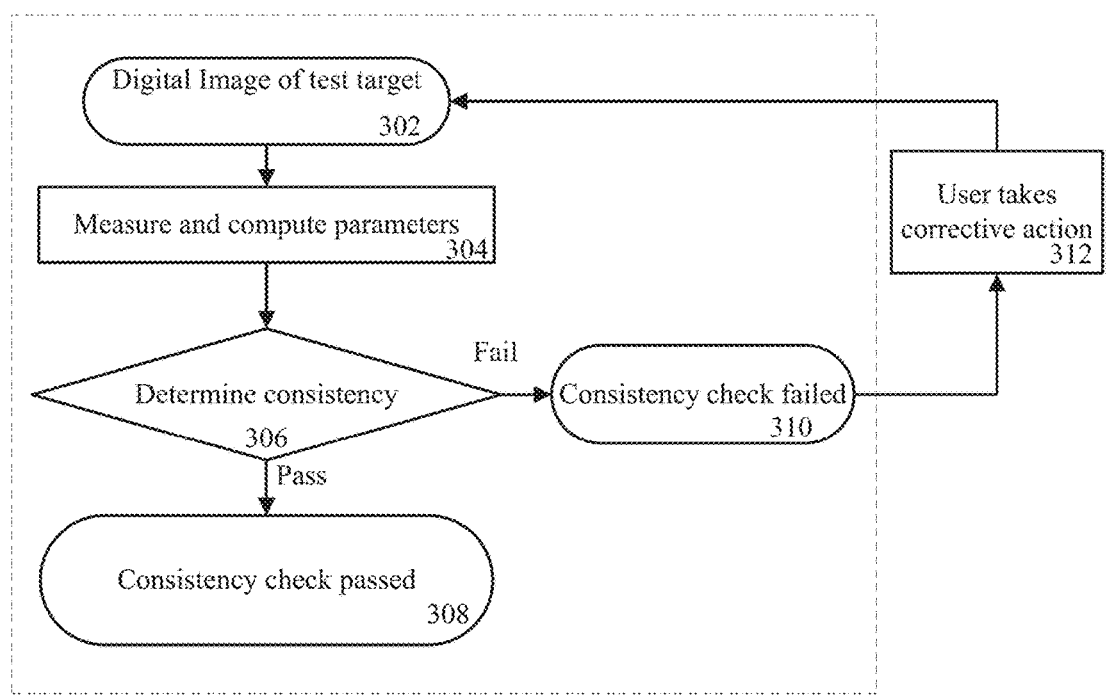
FIG. 3 is a flow chart representing consistency check in accordance with an embodiment.

Further aspects of this disclosure are illustrated with respect to the flowchart 300 shown in FIG. 3, which represents a method of automatic consistency check of the digital image conversion. The first step in process 302 is generating a digital image of the test film. Various parameters are measure and computed in step 304. The system determines the consistency check in step 306 by comparing values of the various parameters against expected results.

If the values of the various parameters are within a threshold, the system outputs an indication that the consistency check has passed in step 308. If the values of the various parameters are not within acceptable range of values, the system indicates a failure of the consistency check in step 310. A user evaluates the test results, determines the necessary corrective action in step 312. Upon taking corrective action, the user initiates the consistency check for the second time.

Automatic Consistency Check

Figure 3A:
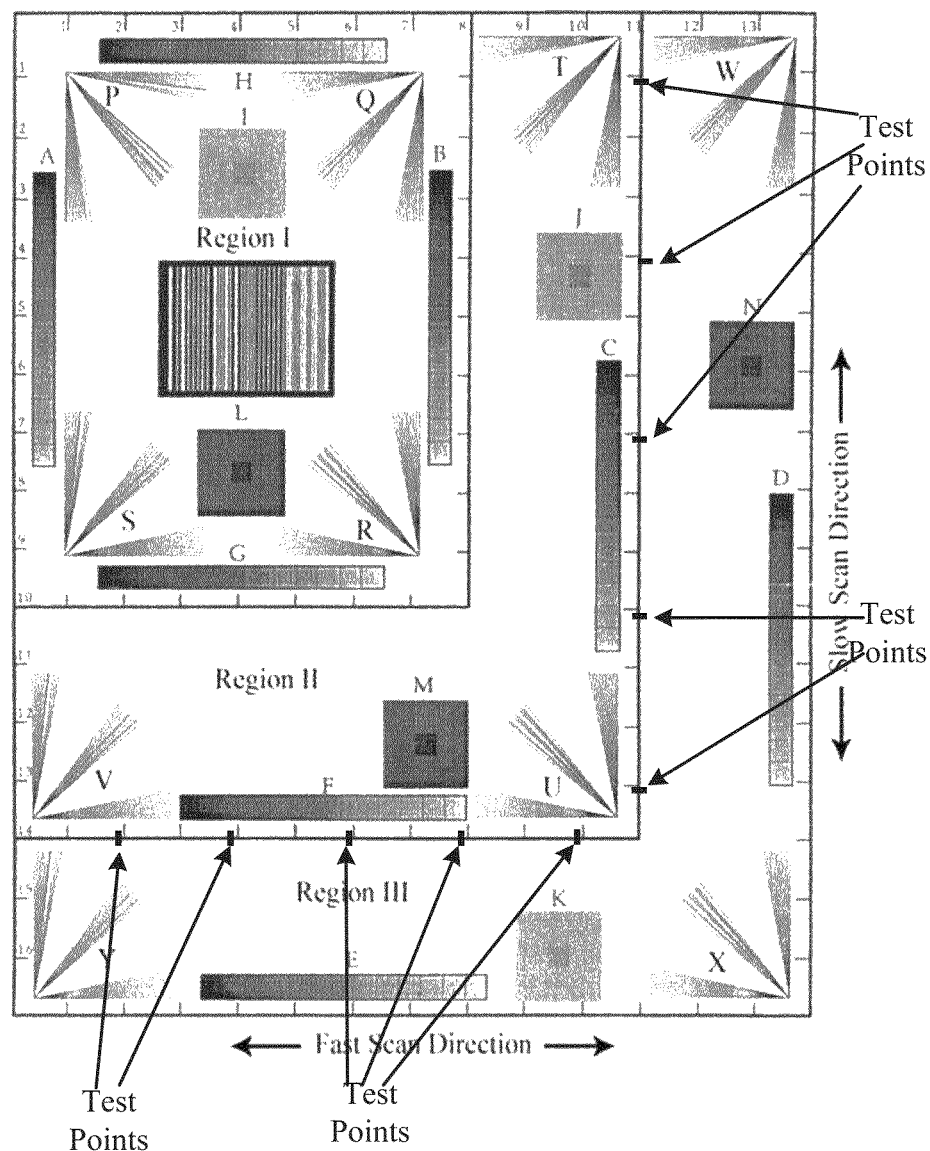
FIGS. 3a-3d illustrate measurement of various parameters for consistency check in accordance with an embodiment.

Automatic consistency check of the quality of the digital image evaluates various parameters by measuring and computing various parameters, and comparing the various parameters against set of expected values. If the measured parameters are within a threshold, the consistency check is considered passed. In an embodiment, the various parameters that are considered for evaluating are measured as follows:

1) Skew and Rotation:

This test checks for skew in the E1936 image. The test includes the steps of defining two or more test points on each ruler marking as shown in FIG. 3a. Plotting the x and y positions of the points, performing a linear fit of the points and determining a slope of the linear fit. The test can be performed on a low density image and/or a high density image.

Figure 3B:
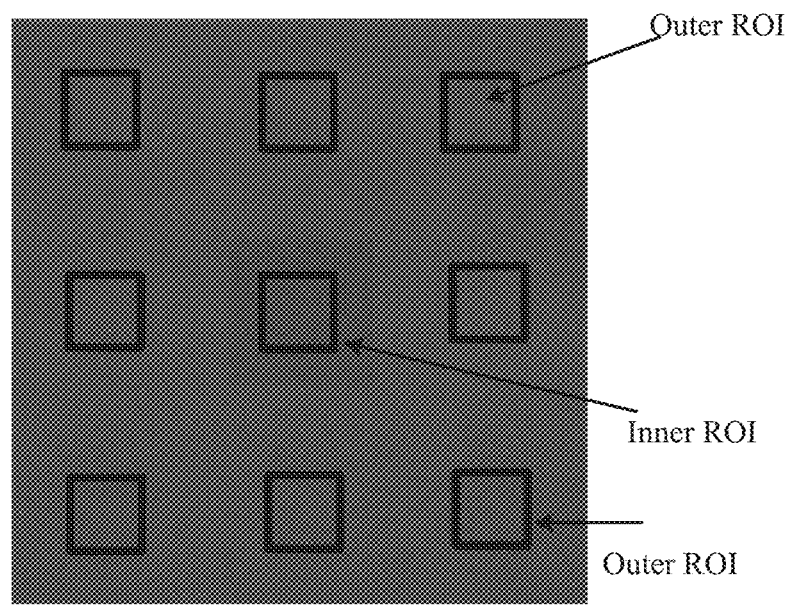

2) Density Contrast Sensitivity:

Contrast of the density of pixels in the image is measured. The steps include defining multiple regions of interest (ROI)

as shown in FIG. 3b, computing patch difference of the mean code value of the center ROI pixels and the mean code value of the outer ROI pixels.

Figure 3C:
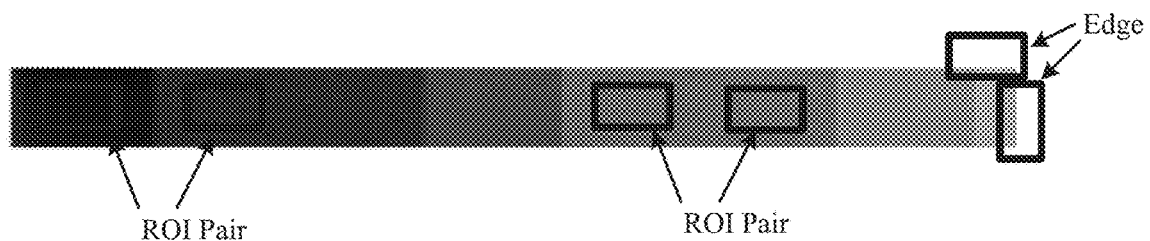

3) Fine Contrast Stepped Density:

Fine contrast density is computed by identifying plurality of Regions Of Interest (ROI) across a plurality of pairs of regions such that the pairs of regions are adjacent. Subsequently, computing difference of density of pixels for each pair of ROI and computing a median or mean pixel value of each ROI. FIG. 3c identifies pairs of ROI.

4) Edge Unsharpness:

The unsharpness of sharp edges is measured by tracing along edges of at least two ROI to obtain edge profile and computing a distance between minimum and maximum of the edge profiles.

Figure 3D:
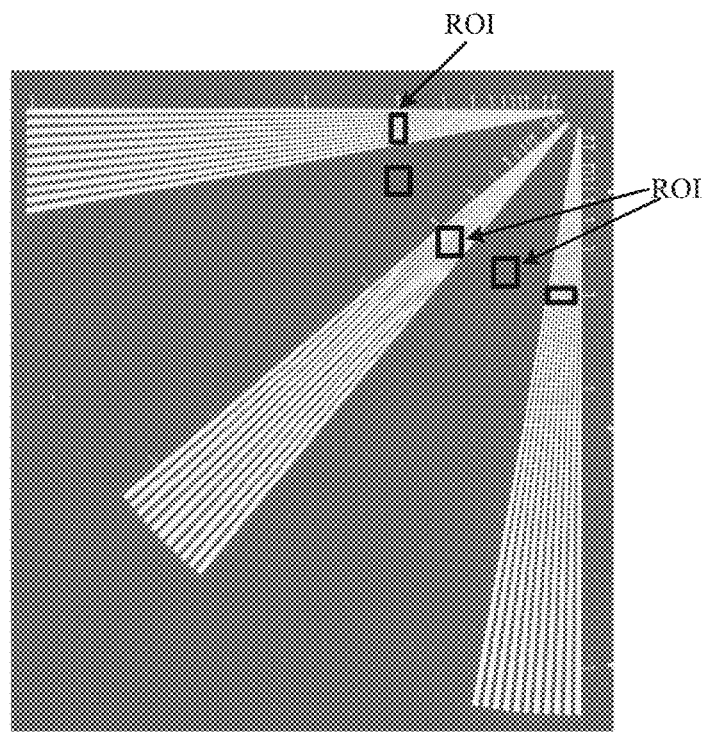

5) Spatial Resolution:

Spatial resolution for each of the converging patterns in the upper left corner of the image and the lower right corner of the image is analyzed. FIG. 3d illustrates the ROI along horizontal, vertical and diagonal directions. Spatial resolution is computed for each line-pair section along horizontal, vertical, diagonal directions by computing average cross-line profile within ROI, computing minimum and maximum gray values for each line pair in the profile, computing mean value of the background ROIs and computing modulation for each line pair.

Returning to the exemplary embodiment shown in FIG. 2, some or all steps in method 200 are performed by one or more users. Users are authenticated and authorized in order to execute the necessary actions for each step which requires a user's action.

Figure 4:
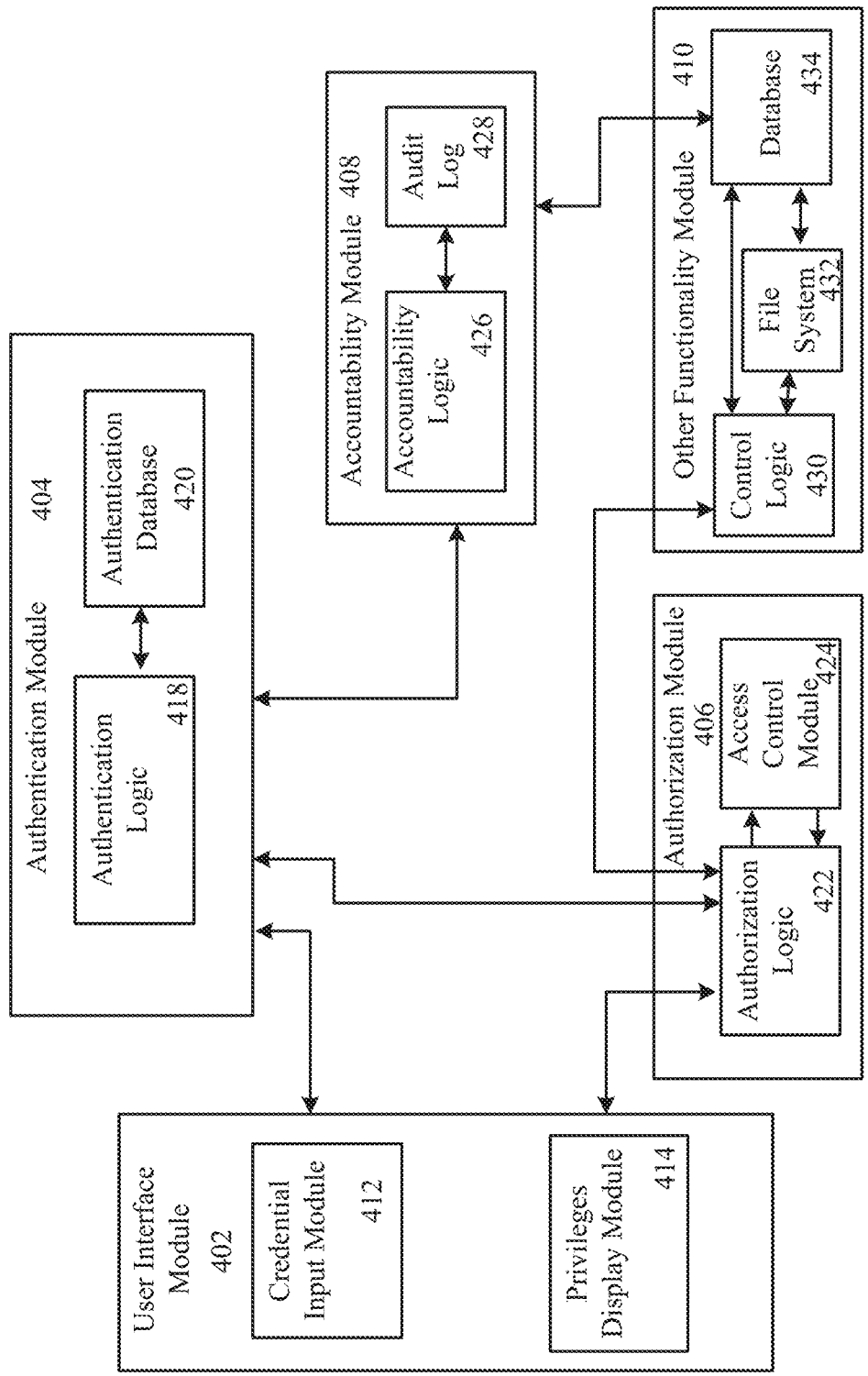
FIG. 4 is schematic representation of a user access and authentication system in accordance with an embodiment.

In an embodiment, authentication can be integrated with any existing authentication mechanism such as Active Directory Service (ADS). FIG. 4 illustrates a system to authenticate and authorize users. System 400 provides role-based access controls and the maintenance of an audit log that tracks the activities of all users of the system as well as the actions performed on entities of the system System 400 illustrated in FIG. 4 comprises a user module and other functionality module 410 among others. In an embodiment, tracking module 102 is similar to other functionality module 410. User Module includes user interface module 402, authentication module 404, authorization module 406, accountability module 408 among others. System 400 manages accountability and role based authorization.

User interface module 402 includes credential input module 412 and privileges display module 414. Credential input module 412 receives user credentials such as user name and password and communicates with authentication module 404. Privileges display modules receives the authorization and access information from authorization module and displays the same to user.

Authentication module 404 includes authentication logic 418 and authentication database 420. Authentication logic 418 received user credentials, verifies the credentials stored in authentication database 420 and communicates the same to authorization module 406 Authentication database 420 stores user credentials. The authentication database 420 is logically separate from database. In some embodiments, authentication logic 418, coverts the user credentials to standard format before verifying. In some embodiment, different credential input mechanisms is supported, the first instantiation for which can be username/password.

Authorization module 406 includes authorization logic 422 and access control module 424. Authorization logic 422 receives the results of credential verification, checks the role and authorization in access control module 424 through Access Control Lists (ACL).

Accountability module 408 includes accountability logic 426 and audit log 428. Accountability logic receives the results of authentication and any action performed by users and stores in audit log.

Other functionality module 410 includes a file system 432 to store the digital images, database 434 to store metadata and control logic 430. Control logic 430 manages the access and transactions on the file system and database based on user authorization.

Figure 5:
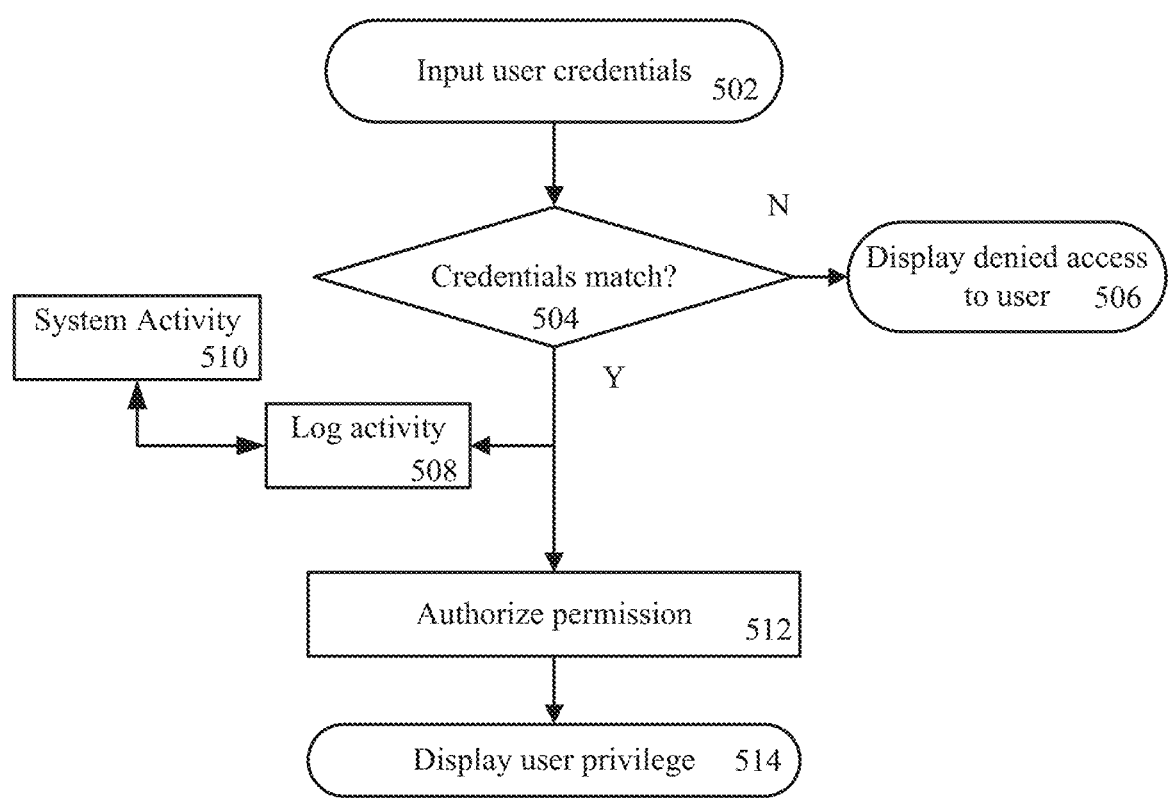
FIG. 5 is a flow chart representing user authentication and authorization in accordance with an embodiment.

To help illustrate aspects of authentication and authorization, an exemplary method 500 is shown in FIG. 5. Method 500 receives user credentials. In an embodiment, the user credentials may be user name and password. In other embodiments, the credentials may be a unique code identifying the user and the access privilege. Step 504 verifies the credentials against a database which is logically separate from the database used to store the metadata. If the credentials do not match, the user is notified of the denial to access to perform any digital image tracking process steps. If the user credentials match, a log of the user credential match is maintained in the audit log. Any user action in the tracking module 102 is logged in audit log 428 along with the time of action.

Figure 6:
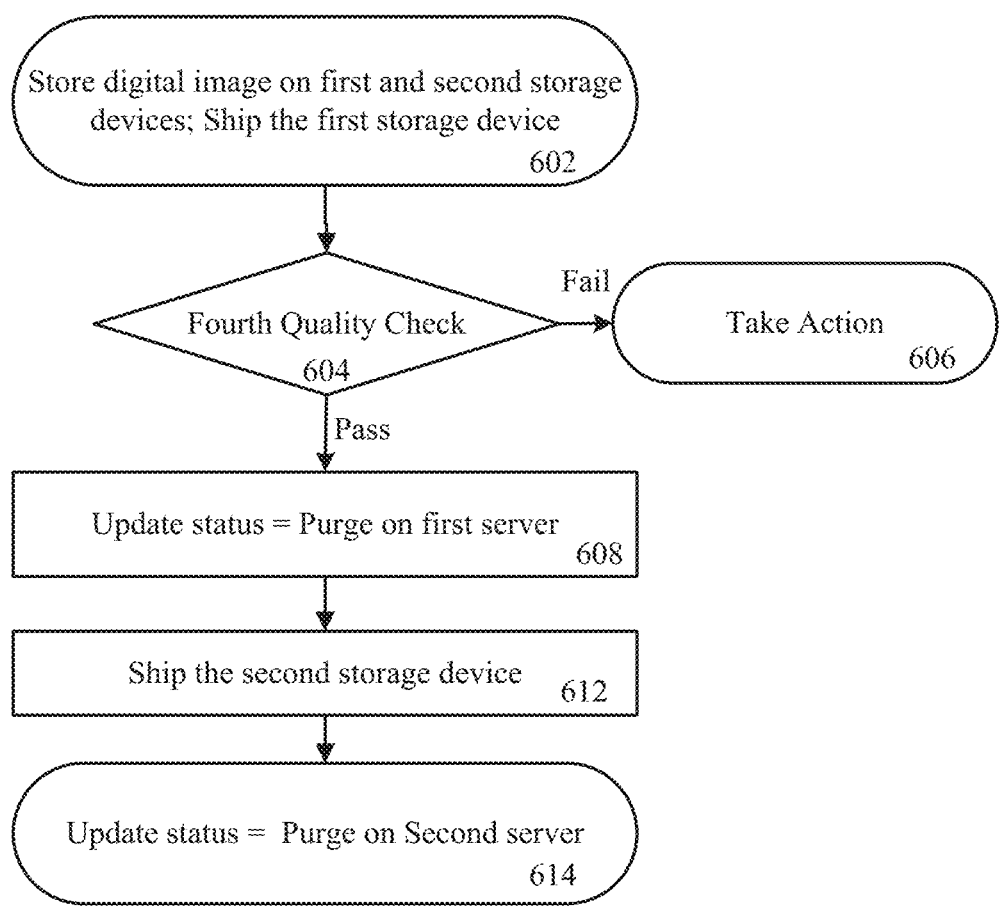
FIG. 6 illustrates a method of management of electronic storage.

Each time a box of radiograph film arrives for digitization and tracking, the electronic data storage requirement grows. In order to manage the electronic data storage space on the servers, processes are required so that electronic data which is not required is purged to make room for new electronic data. Periodically a user checks if there is sufficient electronic data storage space on the first and second file servers. If the electronic data storage space reaches a low threshold on either the first or second file server, the user checks if any of the digital image file can be purged. The electronic data needs to be identified so that required electronic data is not accidentally purged. In an embodiment, efficient management of electronic storage by identifying the digital image file that can be purged is illustrated in FIG. 6.

Digital image is copied on first storage device and second storage devices and the first storage device is shipped in step 602. A fourth quality check of the digital image is performed in step 604 by comparing the digital image on the first storage device with the radiograph film. If the fourth quality check passes, then the status of the image is updated to indicate that digital image file can be purged on the first file server in step 608. If the fourth quality check does not pass, then necessary actions such as digitizing the radiograph once again is performed in step 606. The second storage device is shipped for Disaster Recovery storage in step 612. The status of the digital image is updated to indicate that the associated radiograph film can be reclaimed and the digital image can be purged on the second file server as well in step 614.

Figure 7:
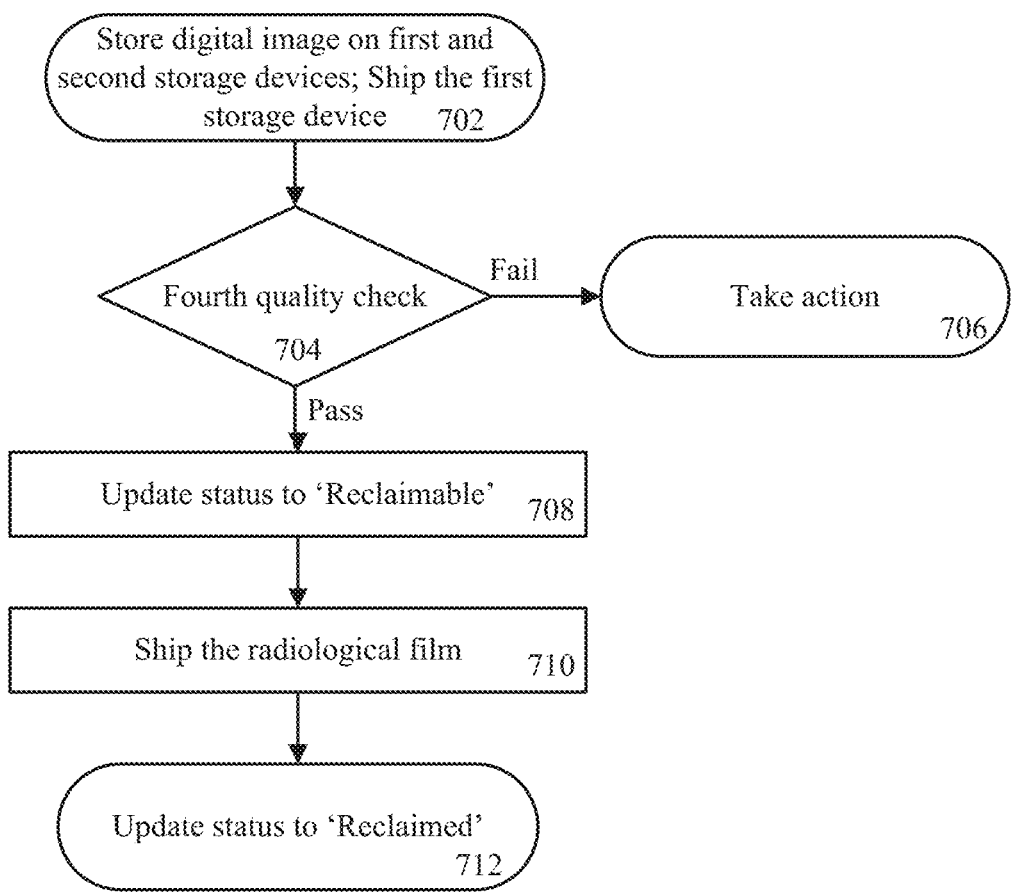
FIG. 7 illustrates a method of identifying radiograph film for reclamation.

FIG. 7 illustrates a method of identifying a radiograph film for reclamation. Digital image is copied on the first and second storage devices and the first storage device is shipped in step 702. A fourth quality check of the digital image is performed in step 704 by comparing the digital image on the first storage device with the radiograph film. If the fourth quality check passes, then the status of the image is updated to indicate that the associated radiograph film is reclaimable in step 708. If the fourth quality check does not pass, then necessary action is taken such as digitizing the radiograph film once again in step 706 and follows the process path. Next the radiograph film is shipped to the reclamation facility and the status in the database is updated to indicate that the radiograph film is reclaimed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method of tracking conversion of data comprising:
receiving plurality of inputs in a plurality of first containers, the plurality of first containers reside in a second container;
generating a second container identifier for the second container;
generating and storing metadata associated with the second container in a first server;
generating a unique first container identifier for each of the plurality of first containers;
storing metadata associated with the each of the plurality of first containers, the metadata associated with the each of the plurality of first containers includes the first container identifier and data associated with the each of the plurality of first containers on the first server;
generating an electronic data for each of the plurality of inputs and storing the electronic data on the first server;
generating and storing a metadata associated with the electronic data for the each of the plurality of inputs on the first server;
storing a status of the electronic data on the first server;
checking a quality of the electronic data on the first server;
storing the electronic data as generated on a storage device, and
tracking conversion of data further comprising automatic consistency check by measuring and computing value of parameters of electronic data of a test input; and determining a consistency check output based on the value of the parameters;
wherein the parameters include skew and rotation, density contrast sensitivity, stepped density, unsharpness, and spatial resolution.

2. The method of claim 1, wherein the electronic data is in a Digital Imaging and Communication in Nondestructive Evaluation (DICONDE) format.

3. The method of claim 1, wherein each of the plurality of inputs is a radiograph film.

4. The method of claim 1, the receiving step further comprises inventory of the second container.

5. The method of claim 1, further comprising converting a manifest associated with a shipment of the second container into electronic format and storing the electronic format of the manifest on the first server.

6. The method of claim 1, the metadata associated with the each of the plurality of first containers, the metadata associated with the second container and the status are stored in a database, wherein the status includes a status of the first container, a status of the second container and a status of the electronic data.

7. The method of claim 1, further comprising generating a file structure to store the electronic data before generating the second container identifier, the file structure comprising a folder associated with the second container, and a subfolder associated with the first container.

8. The method of claim 7, further comprising extracting a metadata from the database, modifying a metadata associated with the folder, and inserting the metadata associated with the folder into header tags of the electronic data stored in the folder.

9. The method of claim 1, wherein a portion of the metadata associated with the each of the plurality of first containers is automatically generated from an image of the first container.

10. The method of claim 1, wherein the checking the quality step is performed for all the electronic data or by applying a sampling algorithm to select the electronic data.

11. The method of claim 1, wherein the checking the quality comprises a user verifying a file structure and data integrity of the electronic data and updating the status.

12. The method of claim 1, wherein the checking the quality comprises a user verifying the metadata of the electronic data file with the meta data associated with the each of the plurality of first containers before proceeding to a storing and updating the status.

13. The method of claim 1, wherein the checking the quality comprises a user comparing the electronic data with the input, selecting for storing the electronic data which meets a criteria, and updating the status.

14. The method of claim 13, further comprising selecting the electronic data which does not meet the criteria for generating the electronic data for a second time.

15. The method of claim 1, further comprising storing the electronic data on a second server before the storing step and checking a quality of the stored electronic data on the second server.

16. The method of claim 15, wherein the checking the quality of the electronic data on the second server comprises a user verifying integrity of data of the electronic data, comparing the electronic data with the input and updating the status.

17. The method of claim 16, wherein the checking the quality step on the second server is performed for all the electronic data or by applying a sampling algorithm.

18. The method of claim 16, where in the storing the electronic data on the storage device comprises the user selecting the electronic data which meets a criteria for storing.

19. The method of claim 16, further comprising selecting the electronic data which does not meet the criteria for generating the electronic data for a second time.

20. The method of claim 1, further comprises checking the electronic data on the storage device comprises comparing the electronic data on the storage device with the input, selecting the input for reclamation and updating the status.

21. The method of claim 20, shipping the input for reclamation and updating the status.

22. The method of claim 20, generating electronic data of the input for a second time for the electronic data which was not reclaimed.

23. The method of claim 1, where in the storage device is any of a solid state device, an optical storage device, and a magnetic storage device.

24. The method of claim 1, further comprising storing the metadata associated with the electronic data on the storage device.

25. The method of claim 1, further comprising indicating to purge the electronic data on the first server.

26. The method of claim 25, further comprising a user checking the indication before deleting the electronic data.

27. The method of claim 1, further comprising storing the electronic data on second storage device.

28. The method of claim 27, further comprising a unique storage identifier associating the electronic data on the storage device and the electronic data on the second storage device.

29. The method of claim 27, further comprising indicating to purge the electronic data on the second server.

30. The method of claim 27, further comprises shipping the storage device; performing a quality check by comparing the electronic data on the shipped storage device with the input; and shipping the second storage device if the quality check passes.

31. The method of claim 30, further comprising applying a security tag before shipping the storage device and checking the security tag for integrity of the storage device.

32. The method of claim 1, further comprising a user management step to authorize a permission to a user to perform a task.

33. The method of claim 32, wherein the task can be any of converting a manifest associated with a shipment of the second container into electronic format, verifying a file structure of the electronic data, verifying the metadata of the electronic data file with the meta data of the each of the plurality of first containers, comparing the electronic data with the input, selecting the electronic data for storing, selecting the input for generation of the electronic data for a second time, selecting the input for shipment, indicating the electronic data to purge, and purging the electronic data.

34. The method of claim 32, wherein the authorizing the permission comprises:
receiving user credentials;
verifying the user credentials with data stored in an authentication database; and
authorizing the permission to the user.

35. The method of claim 34, further comprising an accountability module to track the user and the task.

36. The method of claim 1, further comprising indicating to stop the generation of the electronic data when the value of the parameters is not within threshold values or indicating to continue the generation of the electronic data when the value of the parameters is within the threshold values.

37. The method of claim 1, wherein the test input conforms to American Society for Testing and Materials (ASTM) standard E1936.

38. The method of claim 1, the automatic consistency check is performed before generating electronic data of a first input in the each of the plurality of first containers.

39. The method of claim 1, the automatic consistency check is performed at least once for the each plurality of first containers.

40. The method of claim 1, further comprising generating statistical process control curves of the value of the parameters over a period of time.

41. The method of claim 1, wherein measuring and computing the value of skew and rotation the parameters include comprising:
defining at least two points on each ruler marking;
plotting the x and y positions of the at least two points;
performing a linear fit to the at least two points; and
determining a slope of the linear fit.

42. The method of claim 1, wherein the measuring and computing the value of the density contrast sensitivity comprises:
identifying a plurality of Regions Of Interest (ROI);
determining a patch difference by computing a difference of mean or median code value of center ROI and a mean code value of plurality of outer ROI.

43. The method of claim 1, wherein the measuring and computing the value of the stepped density comprises:
a fine contrast sensitivity and an edge unsharpness,
wherein the computing fine contrast sensitivity includes identifying plurality of Regions Of Interest (ROI) across plurality of pairs ROI wherein the pairs of ROIs are adjacent;
computing a difference of density of pixels for each pair of ROI;
computing a median or mean pixel value of each ROI;
wherein the edge unsharpness includes: identifying two ROIs;
tracing along edges of ROI to obtain edge profile;
computing a distance between minimum and maximum of the edge profile.

44. The method of claim 1, wherein the measuring and computing the spatial resolution comprises performing the spatial resolution algorithm for each pair of ROI along a horizontal, vertical and diagonal lines, where in the spatial resolution algorithm comprises:
computing average cross-line profile within the ROI;
computing a minimum and a maximum gray values for each line pair in the profile and a difference of the maximum and the minimum gray values;
computing mean value of the background ROI;
computing modulation for each line pair by dividing the difference of the maximum and minimum gray values by difference of maximum gray value and mean value of the background ROI.

45. The method of claim 1 further comprising:
receiving the consistency check output by a user;
determining, by the user, to performs corrective action before starting the generation of the electronic data if the consistency check output indicates an adverse result.

46. An image digitizing tracking system comprising:
a processor for converting images to electronic data;
memory to store the electronic data of the image, activity of users and actions performed on the tracking system;
a database to store a metadata and a status associated with the electronic data and the file system; and
a user interface;
an automatic consistency check module in communication with the image digitizing tracking system; and
a metadata module to capture, alter and verify metadata associated with the electronic data and the file system;
wherein the
automatic consistency check further comprising:
measuring and computing value of parameters of electronic data of a test input; and
determining a consistency check output based on the value of the parameters;
wherein the parameters include skew and rotation, density contrast sensitivity, stepped density, unsharpness, and spatial resolution.

47. The system of claim 46, wherein the file system comprises a folder associated with a second container identifier, a sub-folder associated with a first container identifier and electronic data file associated with the input,
wherein the first container hold a plurality of the input, the second container holds a plurality of first container.

48. The system of claim 46, wherein a manifest associated with the second container is stored in the database.

49. The system of claim 46, further comprising a user module to authenticate and authorize permission to the user.

50. The system of claim 49, wherein the user module and the database are stored in logically separate devices.

51. The system of claim 49, where in the user module comprises:
   a user interface module for receiving the user credentials and displaying user permission;
   an authentication module for authenticating the user by comparing the user credentials with an authentication database; and
   an authorization module for authorizing the permission to the user.

52. The system of claim 51, further comprising an accountability module for tracking and storing actions of the user.

53. The system of claim 46, where in the data conversion tracking system, the consistency check module, and the metadata module reside in a mobile unit.

54. The system of claim 46, wherein measuring and computing the value of skew and rotation comprising:
   defining at least two points on each ruler marking;
   plotting the x and y positions of the at least two points;
   performing a linear fit to the at least two points; and
   determining a slope of the linear fit.

55. The system of claim 46, wherein the measuring and computing the value of the density contrast sensitivity comprises:
   identifying a plurality of Regions Of Interest (ROI);
   determining a catch difference by computing a difference of mean or median code value of center ROI and a mean code value of plurality of outer ROI.

56. The system of claim 46, wherein the measuring and computing the value of the stepped density comprises:
   a fine contrast sensitivity and an edge unsharpness,
   wherein the computing fine contrast sensitivity includes
      identifying plurality of Regions Of Interest (ROI) across plurality of pairs ROI wherein the pairs of ROIs are adjacent;
      computing a difference of density of pixels for each pair of ROI;
      computing a median or mean pixel value of each ROI;
   wherein the edge unsharpness includes:
      identifying two ROIs;
      tracing along edges of ROI to obtain edge profile
      computing a distance between minimum and maximum of the edge profile.

57. The system of claim 46, wherein the measuring and computing the spatial resolution comprises performing the spatial resolution algorithm for each pair of ROI along a horizontal, vertical and diagonal lines, where in the spatial resolution algorithm comprises:
   computing average cross-line profile within the ROI;
   computing a minimum and a maximum gray values for each line pair in the profile and a difference of the maximum and the minimum gray values;
   computing mean value of the background ROI;
   computing modulation for each line pair by dividing the difference of the maximum and minimum gray values by difference of maximum gray value and mean value of the background ROI.

* * * * *